United States Patent [19]

Kim et al.

[11] Patent Number: 4,978,993

[45] Date of Patent: Dec. 18, 1990

[54] CORRECTION DEVICE FOR NON-UNIFORM ILLUMINATIONS IN RATIO-VARIABLE COPY MACHINE

[75] Inventors: Geun Kim; Seung-Il Kang, both of Seoul, Rep. of Korea

[73] Assignee: Sindo Ricoh Co., Ltd., Seoul, Rep. of Korea

[21] Appl. No.: 362,227

[22] Filed: Jun. 6, 1989

[51] Int. Cl.[5] .......... G03B 27/36

[52] U.S. Cl. .......... 355/58; 355/71

[58] Field of Search .......... 355/71, 58, 235, 243

[56] References Cited

U.S. PATENT DOCUMENTS 4,740,815 4/1988 Tsuruoka .......... 355/71 X 4,806,989 2/1989 Saito et al. .......... 355/71 X

*Primary Examiner*—L. T. Hix

*Assistant Examiner*—D. Rutledge

*Attorney, Agent, or Firm*—Michael N. Meller

[57] ABSTRACT

A correction device for non-uniform illumination is disclosed for use in a copy machine in which ratio variations such as enlargement and reduction copyings are possible. The original sheet to be copied is placed at the center, and some measures are provided to correct the non-uniformness of the illumination in the lengthwise direction of the slit. The improvements of the present invention comprise a pair of light adjusting plates disposed pivotally around a shaft and at a distance from the lens; and a pair of auxiliary light adjusting plates for adjusting the position of the light adjusting plates in an interlocked state with the displacement of the lens. The light adjusting plates are not to shield the light path in the case of enlargement copying ratios, but the plates are properly displaced to shield the light path correspondingly with the copying ratio variations only in the case of reduction copyings in order to correct the non-uniformness of the illumination in the lengthwise direction of the slit.

1 Claim, 4 Drawing Sheets

CORRECTION DEVICE FOR NON-UNIFORM ILLUMINATIONS IN RATIO-VARIABLE COPY MACHINE.

FIELD OF THE INVENTION

The present invention relates to a correction device for non-uniform illumination in a slit illumination type ratio-variable copy machine in which different ratio copying such as enlargements and reductions are possible. The original sheet is centrally placed, and the non-uniform illumination arising on the light-sensitive medium in the direction of the slit length in the vicinity of the equivalent ratio copying can be corrected to a uniform state.

BACKGROUND OF THE INVENTION

Presently, the dominating trend in the demand of copy machines with multifunctions is the preference of ratio-variable copy machines which are capable of performing enlargements and reductions.

Therefore, a device meeting the requirement of continuous ratio variations is needed. A typical optical system for such a slit illumination type ratio variable copy machine is illustrated in FIG. 7, and will be described below. That is, the original sheet placed on the contact glass to be copied is slit-illuminated by the illumination lamp upon starting of the copy machine an image is formed on a drum having a light-sensitive coating by components such as a first mirror, a second mirror, a third mirror, an image forming lens, and a fourth mirror.

In such an optical system, an illumination lamp and the first mirror are unitizingly fixed to a first carriage. The second mirror and the third mirror are fixed to a second carriage, while, along an elongate guide, the first carriage is driven at a certain speed V, and the second carriage is driven at a half speed thereof in the same direction, in such a manner that the object distance between the original sheet and the lens on the one hand and the image distance between the lens and the light-sensitive medium on the other hand are kept constant, thereby making it possible to carry out the slit-illumination scanning.

Accordingly, in the case where the copying ratio is not to be varied in this optical system, the first carriage is placed at the standard position which is indicated by the solid lines, and at the same time, the second mirror and the third mirror are associatively displaced in the direction of the scanning. In the case where an enlargement is to be carried out, the same component is displaced toward the left side to the position indicated by the dotted lines, in the case where a reduction copying is to be carried out, the second and third mirrors and the lens are displaced respectively to the left and right. In the case where the original sheet is placed centrally, the lens is displaced in the direction of the scanning in the case of a varied ratio copying. For example, the lens is displaced correspondingly with the ratio variation by means of a wire connected to a motor, while the second and third mirrors, the cam, the wire and the pulley are also displaced. Even in the case where the original sheet to be copied is scanned by a uniform illumination in the slit direction, depending on the incident angle of the image of the original sheet relative to the lens, the illumination on the light-sensitive medium is varied by the governing formula of the fourth power of cosine, and the illumination on the opposite end portions is lowered compared with the portion at the optical axis.

In the case of an equivalent copying ratio, the non-uniformness of the illumination on the light sensitive medium is corrected, usually by making the width of the opposite end portions of the slit in the direction of the scanning larger than that of the center, or by varying the illumination distribution of the lamp, with the width of the slit being kept intact.

On the other hand, in the case of a different copying ratio, the distance between the original sheet and the lens and the distance between the lens and the light sensitive medium are varied. As will be explained with respect to FIG. 2, the incident angle Θm(x) of the light beam which has been reflected from an image position x on the original sheet of FIG. 2 and has passed through the center of the lens will be different from the incident angle Θmb(x) of the light beam which has been reflected from the same point under the equivalent copying ratio. The non-uniformity of the illumination for different positions on the light sensitive medium can be calculated based on the following formula:

$$\text{Ratio} = \frac{\text{Cos}^4(\Theta m(x))}{\text{Cos}^4(\Theta mb(x))} \quad (1)$$

Assuming the image height 0 (the central position of the slit) to be 100%, the examples of the non-uniformness of the illumination for different heights of the image and for different copying ratios will be described with reference to the graph of FIG. 1. In the case of enlarged copyings, the decrease is 7% even under an enlargement ratio of 1.41 and at an image height of 150 mm, while, in the case of reduction copyings, the increase in some cases is shown to be 20% even under the ratio of 0.5 and at an image height of 75 mm, with the result that a non-uniformness of illumination in the form of too bright illumination on the opposite end portions of the slit is produced in the case of a reduction copying.

As will be discussed in the simplified drawing of FIG. 3, if the illumination distribution on the original sheet is shown as in (a), then the illumination distribution (b) on the surface of the drum will be produced as indicated by 6 in the case of an equivalent copying ratio, will be produced as indicated by 5 in the case of a reduction copying ratio, and will be produced as indicated by 7 in the case of an enlargement copying ratio. In order to correct such a non-uniform illumination, it has been proposed that two light adjusting plates be placed in order to shield the light beams from the opposite sides. But in this method, the light beams from the opposite sides enter after having been shielded, and therefore, the light beams for the upper height of the image are shielded off in large amounts, resulting in that, in the case where the reduction ratio is large, considerable portions of the opposite edges of the paper are not copied.

SUMMARY OF THE INVENTION

Therefore, the present invention is intended to overcome the disadvantages of the conventional ratio-variable copy machine. It is the object of the present invention to provide a correction device for non-uniform illumination in a ratio-variable copy machine in which the non-uniform illumination on the light-sensitive medium in the lengthwise direction of the slit is corrected to a uniform illumination.

In consideration of the fact that, in the conventional device, insufficient enlargements are seen at the opposite edges of the paper in the case of enlargement copying, and non-uniformness of the illumination at the opposite edges is severe compared with the middle portion of the paper in the case of reduction copying, the present invention provides auxiliary light adjusting plates, and the existing light adjusting plate is made to slide relative to the auxiliary light adjusting plates in the direction of the height of the existing light adjusting plate, in such a manner that the non-uniformness of the illumination in the lengthwise direction of the slit should be corrected smoothly over a wide range of continuous ratio variations.

In other words, the light path is not shielded in an enlargement copying ratio, but the light path is shielded correspondingly with the ratio variation in the case of a reduction copying ratio in such a manner that the non-uniformness of the illumination should be corrected. Further, in another aspect, the light projection area in the lengthwise direction is made to be determined by the light shield amount through the light adjusting plate, and this value is defined as the variation from that of the equivalent copying ratio.

BRIEF DESCRIPTION OF THE DRAWINGS

The above object and other advantages of the present invention will become more apparent by describing the preferred embodiment of the present invention with reference to the attached drawings in which:

FIG. 4 illustrates the theoretical aspects of the present invention, in which:

DESCRIPTION OF THE PREFERRED EMBODIMENT

As mentioned above, the present invention is intended to give the solution to the problem that slight insufficiencies are seen near the opposite edges of the paper in the case of an enlargement, and, the non-uniformness of the illumination becomes more outstanding on the opposite edges compared with the middle portion in the case of a reduction copying.

Figure 5A:
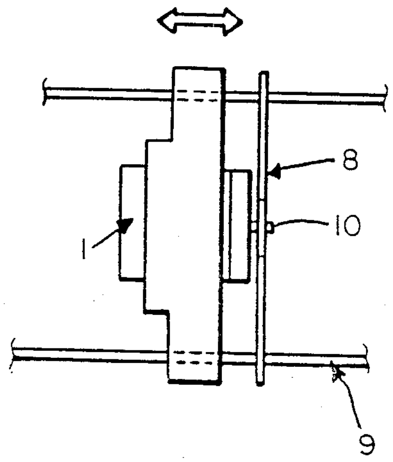
FIGS. 5 and 6 are schematic illustrations of the actuation relationship between the lens, the existing light adjusting plates and the auxiliary light adjusting plates.
Figure 5B:
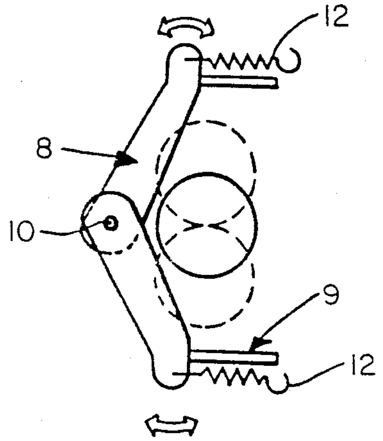
Figure 6:
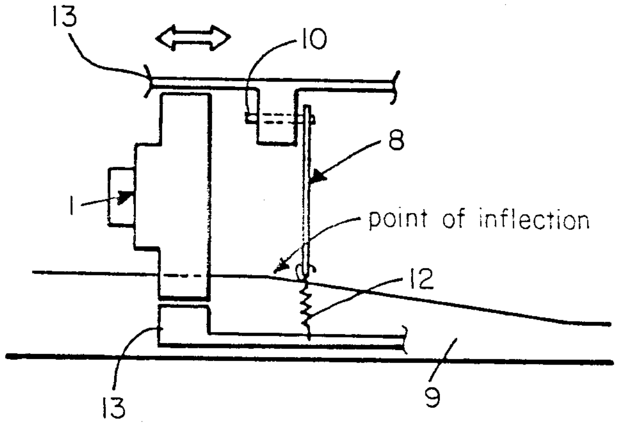
Figure 7:
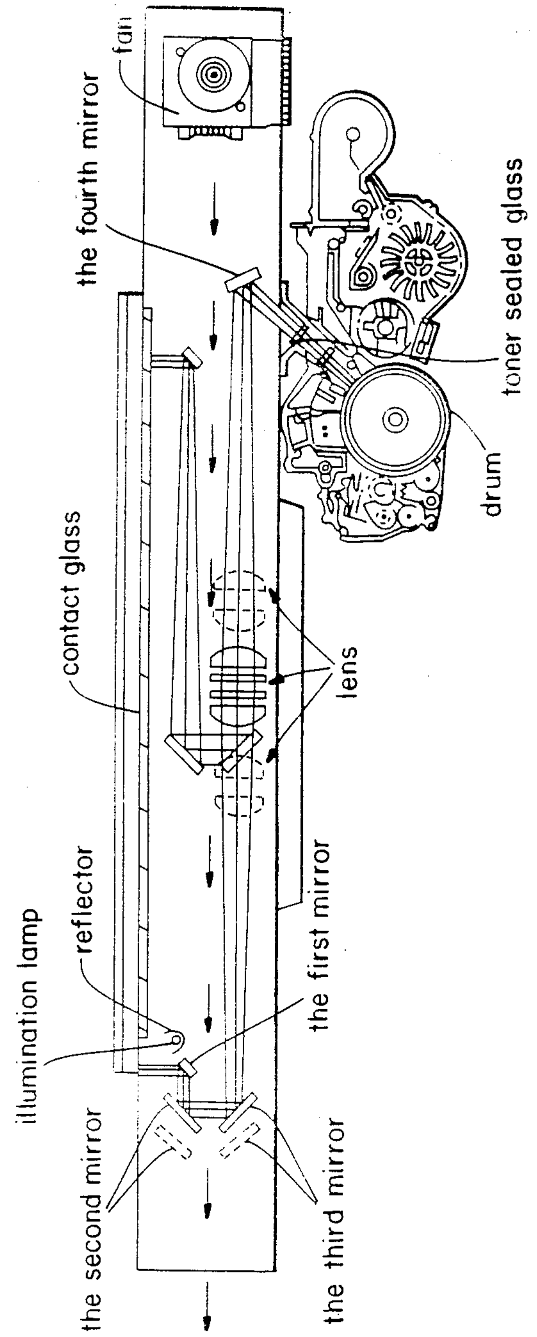
FIG. 7 is a schematic illustration of a typical optical system of the conventional ratio-variable copy machine.

Referring to the drawings and particularly to FIGS. 5 and 6, for this purpose, a pair of light adjusting plates 8 are pivotally mounted on shaft 10 to be pivotal in the lengthwise direction of the slit, and to be symmetrically disposed in the lengthwise direction of the slit at a certain distance from the lens toward the light sensitive medium. These plates 8 are installed in such way that they do not shield the light path in the case of enlargement copying ratios and an equivalent copying ratio. They do shield the light path partially only in the case of reduction copying ratios correspondingly with the reduction ratios by adjusting the said plates 8 correspondingly with the variation ratios. Further, the adjustments of the plates 8 are interlocked with the displacement of the lens for variations of the ratio. The plates 8 are angularly displaced by means of a pair of cam-shaped auxiliary light adjusting plates 9 so that the light adjusting plates 8 should be displaced in their angular positions relative to the shaft 10.

Now the operating principle of the device of the present invention constituted as above will be described below.

Figures 4A, 4B, 4C:
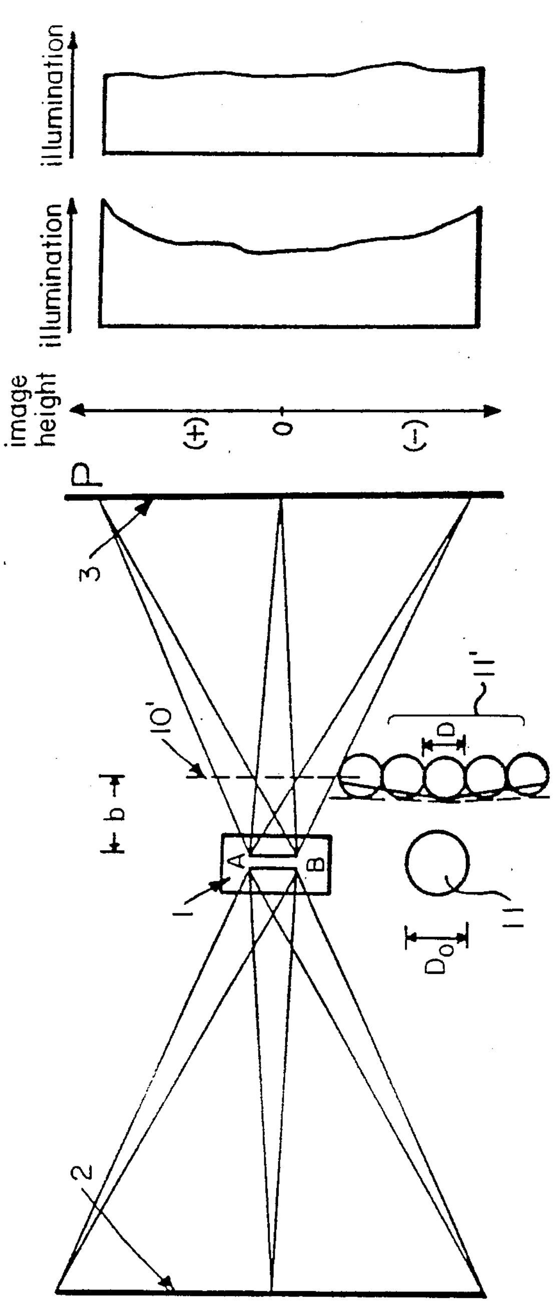
FIG. 4*a* is a schematic illustration of the optical system.
FIG. 4*b* is an illumination distribution on an image in the case where there is no light adjusting plate.
FIG. 4*c* is an illumination distribution on an image in the case where there is installed light adjusting plates.

In the simplified illustration of the optical system of FIG. 4*a*, a triangle (actually a circular cone) formed by connecting the opposite ends A, B of the diameter of the lens and the uppermost point of the image height is imagined.

If it is assumed that a light beam passing through the uppermost point comes into the imagined triangle, the light adjusting plates 8 will be displaced from near the lens 1 toward the image as much as a certain light adjusting angle Θ within the imagined triangle. Then at the position of b, the light amount reaching the uppermost point is decreased as much as the light adjusting area (the shaded area) against the circular radiating area of the lens having the radiating diameter D.

Reference No. 10 indicates the position of the auxiliary light adjusting plate 9.

Further as the image height is lowered, the illumination area becomes smaller. Therefore, if the light adjusting plates 8 are adjusted such that the reduction of the light amount due to the light adjusting plates 8 should be equal to the increase of the light amount at the uppermost point 0 of the image height, then the non-uniformness of the illumination will be corrected.

Figure 1:
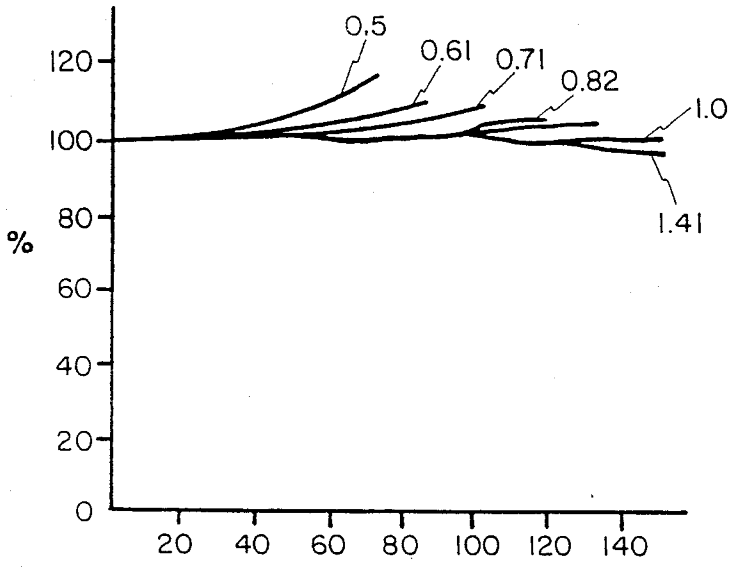
FIG. 1 is a graphical illustration of illumination distributions for different ratio variations in the case where there is no light amount adjusting device.
Figure 2:
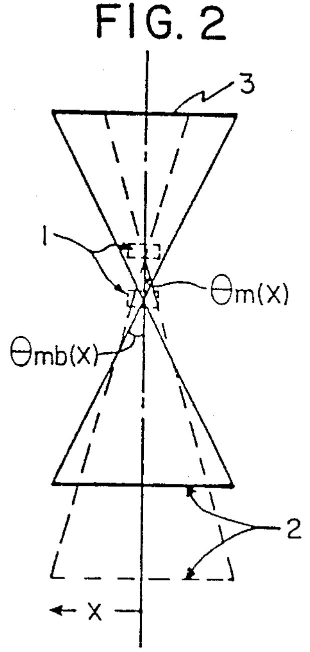
FIG. 2 shows incident angles of the light coming from the image height x of the original sheet relative to the lens for different variation ratios.
Figure 3A:
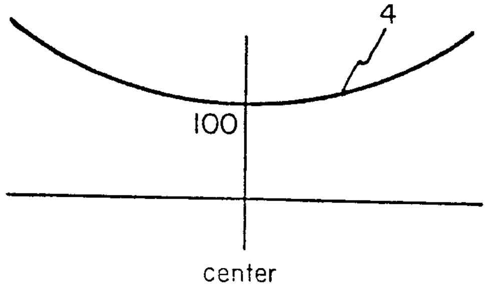
FIG. 3*a* is a schematic illustration of the illumination distribution on a original sheet.
Figure 3B:
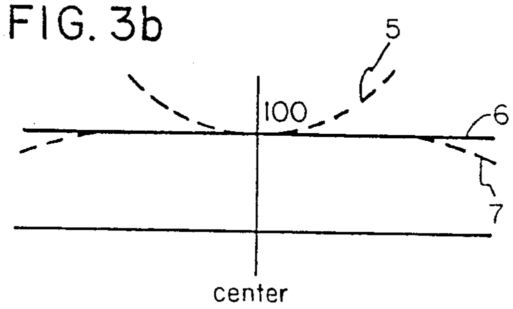
FIG. 3*b* is a schematic illustration of the illumination distribution on the image in the case of a varied ratio.

As shown in FIG. 1, the light amount at the highest image point is varied depending on the variations of the copying ratio. Therefore the value of the illumination angle of the light adjusting plate 8 which is positioned at a distance b from the lens 1 has to be obtained for each of the variation ratios. In this way the shapes of the light adjusting plates 8 and the auxiliary light adjusting plates 9 can be determined so that their displacements can be interlocked with the displacements of the lens for different variation ratios, in such a manner that the illumination angle Θ of the light adjusting plates 8 should correspond with the obtained value of the angle for each of the variation ratios.

FIG. 4*b* shows the illumination distribution on the image in the direction of the slit in the case where the light adjusting plates are not provided, while FIG. 4*c* shows a corrected illumination distribution in the case where the light adjusting plates 8 are installed in the opposite directions as in the case of FIG. 4*a*.

In order to correct the illuminations at the opposite ends of the slit to a smooth uniform shape, two light adjusting plates 8 can be installed as shown in FIG. 5, in such a manner that the plates 8 are disposed at the distance b from the lens in the forward direction thereof, are disposed symmetrically in the lengthwise direction of the slit, and are capable of moving parallel with the slit.

The positions of the light adjusting plates 8, which are determined based on the principle described above, have to be properly designed by taking into account the shielded amount of the light for each image height. The reason is that the light shielding ratio at each image height is decided by the position of the light adjusting plates 8.

FIGS. 5 and 6 illustrate the embodiment of the present invention in a frontal view, a side view and a plan view respectively.

The light adjusting plates 8 are installed on lens brackets 13 which support the lens 1, in such a manner that they are disposed symmetrically to the optical axis and in the opposite lengthwise directions of the slit at the same time the plates 8 are disposed near the lens 1 and forwardly from the lens 1 so that they can be adjusted by adjusting the height of the auxiliary light adjusting plates 9.

The up and down movements of the light adjusting plates 8 can be carried out by gravity, but in the case where this is difficult, forced displacements thereof can be obtained by installing tension springs 12 to the lens brackets 13. In this case, one tip of each of the light adjusting plates 8 can be secured to each of the lens brackets 13 by means of a shaft 10 in an interlocked state with the displacements of the lens 1, so that the plates 8 should have a pertinent shield angle Θ corresponding to the variation of the height of the auxiliary light adjusting plates 9 for different copy ratios. The light adjusting plates 8 will come into the light path only in the case of reduction copying, and, as the reduction ratio becomes larger, the shielding amount is increased, while no correction is made in the case of an enlargement copying.

Therefore, as shown in FIG. 6, when the lens 1 is at the position of the equivalent copying ratio, the light adjusting plates 8 are at the point of inflection of the auxiliary light adjusting plates 9. Accordingly, in the cases of the equivalent copying ratio and enlargement copying ratios, the height of the auxiliary light adjusting plates 9 are not varied and no shielding of the light beams occur. In the case of reduction copying ratios, the height of the auxiliary light adjusting plates 9 is lowered, thereby making the light adjusting plates 8 shield the light path.

Therefore, the height of the auxiliary light adjusting plates 9 has to be properly designed by taking into account the shielding ratio of the light path.

Thus the device of the present invention completely overcomes the disadvantage of the conventional device wherein the shielding is concentrated on the opposite edges resulting in that the illuminations near the opposite edges become weaker than at the middle portion of the paper, because two shielding plates come into the light path in a direction perpendicular both to the slit direction and to the optical axis.

Meanwhile, in the device of the present invention which overcomes the non-uniformness of the illumination of the conventional device, the light adjusting plates 8 of the present invention having a shape of the wing of a butterfly are made to come into the light path in an inclined direction so that the portions corresponding to the lower image heights as well as the opposite edges are properly shielded at proper rates, thereby making the illumination uniform. Further, the shapes of the auxiliary light adjusting plates 9 can be modified in such a manner that the lens brackets 13 are made to play the role of guide rods by making them move in the direction of the scanning, to save manufacturing cost of the optical system Further, the light adjusting leading ends of the plates 8 are not formed in a vertical shape but in almost a horizontal type, and therefore, there is the advantage that the amount of flared light due to the light adjusting plates 8 is very much reduced compared with the device having a horizontal type light adjusting leading end.

In other words, the device of the present invention is so constituted that the light adjusting plates 8 slide in an interlocked with the displacement of the height of the auxiliary light adjusting plates 9 as the lens 1 is displaced for different copying ratios, thereby making it possible to smoothly correct the non-uniformness of the illumination in the lengthwise direction of the slit for extensive variations of the copying ratios.

Thus, in the device of the present invention, the light path is not shielded in the case of enlargement ratios, but only in the case of reduction copyings, the light path is properly shielded.

The present invention was described above based on the preferred embodiment thereof, but it should be understood that various changes and modifications can be added to the embodiment described without departing from the scope of the present invention which is defined in the attached claims.

What is claimed is:

1. In a correction device for non-uniform illumination in a ratio-variable copy machine in which enlargement and reduction copyings are made by displacing the lens and a part of the mirrors of the copy machine in the direction of the scanning and the original sheet is placed at the center of the optical axis the improvements provided to correct the non-uniformness of the illumination in the lengthwise direction of the slit comprising; a pair of light adjusting plates disposed pivotally around a shaft and at a certain distance from the lens in the direction of the location of the light-sensitive medium; and a pair of auxiliary light adjusting plates for displacing the angular position of said light adjusting plates relative to said shaft in an interlocked state with the displacement of the lens for different copying ratios, said light adjusting plates are made not to shield the light path in the case of enlargement copying ratios, but said light adjusting plates are properly displaced to shield the light path corresponding with the copying ratio variations only in the case of reduction copyings in order to correct the non-uniformness of the illumination in the lengthwise direction of the slit.

* * * * *